United States Patent
Dai et al.

(10) Patent No.: US 9,300,007 B1
(45) Date of Patent: Mar. 29, 2016

(54) ULTRASONIC WELDING OF LITHIUM ONTO A CURRENT COLLECTOR

(75) Inventors: Xiangyang Dai, East Amherst, NY (US); Mark J. Roy, Buffalo, NY (US)

(73) Assignee: Greatbatch Ltd., Clarence, NY (US)

( * ) Notice: Subject to any disclaimer, the term of this patent is extended or adjusted under 35 U.S.C. 154(b) by 233 days.

(21) Appl. No.: 13/346,409

(22) Filed: Jan. 9, 2012

Related U.S. Application Data

(60) Provisional application No. 61/430,655, filed on Jan. 7, 2011.

(51) Int. Cl.

| | |
|---|---|
| H01M 10/04 | (2006.01) |
| H01M 10/052 | (2010.01) |
| H01M 4/131 | (2010.01) |
| H01M 4/36 | (2006.01) |
| H01M 4/525 | (2010.01) |
| H01M 4/04 | (2006.01) |

(52) U.S. Cl.
CPC ............ *H01M 10/052* (2013.01); *H01M 4/043* (2013.01); *H01M 4/131* (2013.01); *H01M 4/366* (2013.01); *H01M 4/525* (2013.01)

(58) Field of Classification Search
CPC ..... H01M 10/052; H01M 4/131; H01M 4/13; H01M 4/366; H01M 4/525; H01M 10/0431
USPC .......................................... 429/188–189, 172
See application file for complete search history.

(56) References Cited

U.S. PATENT DOCUMENTS

| | | |
|---|---|---|
| 4,252,263 A | 2/1981 | Houston |
| 4,761,355 A | 8/1988 | Skarstad et al. |
| 4,865,932 A | 9/1989 | Masuda et al. |
| 5,250,373 A | 10/1993 | Muffoletto et al. |
| 5,354,629 A | 10/1994 | Kuroda et al. |
| 5,571,146 A | 11/1996 | Jones et al. |
| 5,750,286 A | 5/1998 | Paulot et al. |
| 6,503,640 B2 | 1/2003 | Wittebrood et al. |
| 6,929,881 B2 | 8/2005 | Wutz et al. |
| 7,081,142 B1 | 7/2006 | Carlson |

(Continued)

FOREIGN PATENT DOCUMENTS

| | | |
|---|---|---|
| EP | 0532312 | 3/1993 |
| EP | 1282178 | 2/2003 |

(Continued)

OTHER PUBLICATIONS

Brain, Marshall, "How Capacitors Work", electronics.howstuffworks.com/capacitor.htm, 1994, HowStuffWorks, Inc, p. 1.*

(Continued)

*Primary Examiner* — Jonathan Jelsma
*Assistant Examiner* — Rashid Alam
(74) *Attorney, Agent, or Firm* — Steven W. Winn

(57) ABSTRACT

An ultrasonic welding process for joining a current collector to an anode or cathode material of electrochemical cells is described. The ultrasonic welding process utilizes an ultrasonic welding frequency which may be combined with an applied force to bond dissimilar metals comprising the electrode material and the current collector. Preferably, the method is used to bond the anode material to the anode current collector. This method of attachment is suitable for either primary or secondary cells, particularly those powering implantable biomedical devices.

23 Claims, 10 Drawing Sheets

(56) References Cited

U.S. PATENT DOCUMENTS

| | | |
|---|---|---|
| 7,108,942 B1 | 9/2006 | Gan et al. |
| 7,341,802 B1 | 3/2008 | Ota et al. |
| 7,539,007 B2 | 5/2009 | Zhao et al. |
| 7,622,219 B2 | 11/2009 | Ota et al. |
| 2001/0003863 A1 | 6/2001 | Thibault et al. |
| 2004/0038070 A1 | 2/2004 | Dockus et al. |
| 2005/0158623 A1* | 7/2005 | Matsui et al. ............ 429/200 |
| 2006/0188777 A1* | 8/2006 | Kaneta ..................... 429/128 |
| 2007/0037054 A1 | 2/2007 | Kikuchi et al. |
| 2008/0070111 A1* | 3/2008 | Abe et al. ................ 429/163 |
| 2008/0145753 A1* | 6/2008 | Spillman et al. .......... 429/176 |
| 2009/0111012 A1* | 4/2009 | Shibuya et al. ........... 429/163 |
| 2010/0112434 A1* | 5/2010 | Akou et al. ............... 429/174 |
| 2011/0135996 A1* | 6/2011 | Ahn et al. ................. 429/162 |

FOREIGN PATENT DOCUMENTS

| | | |
|---|---|---|
| EP | 1791198 | 5/2007 |
| EP | 1876668 | 1/2008 |
| EP | 2083462 | 7/2009 |
| EP | 2317589 | 5/2011 |
| EP | 2325928 | 5/2011 |

OTHER PUBLICATIONS

European Search Report for 2325928 dated Jun. 16, 2011.

* cited by examiner

ULTRASONIC WELDING OF LITHIUM ONTO A CURRENT COLLECTOR

CROSS-REFERENCE TO RELATED APPLICATIONS

This application claims priority from U.S. Provisional Patent Application Ser. No. 61/430,655, filed Jan. 7, 2011.

FIELD OF THE INVENTION

The present invention relates to the art of electrochemical cells, and more particularly, to an improved method of welding a current collector to its associated electrode material.

The present invention is of an ultrasonic welding method by which the lithium electrode material is directly connected to the current collector.

PRIOR ART

The recent rapid development in small-sized electronic devices having various shape and size requirements requires comparably small-sized electrochemical cells of different designs that can be easily manufactured and used in these electronic devices. Preferably, the electrochemical cell has a high energy density, and one commonly used cell configuration is a prismatic, case-negative cell design having an intermediate cathode flanked by opposed anode components in contact with the casing and in electrical association with the cathode.

The diverse variety of materials used in the construction of electrochemical cells increases the difficulty of assembling and manufacturing such small intricate devices. It is desirable to build such electrochemical cells with simplified procedures that create an electrochemical cell with a durable and robust construction. Such electrochemical cells require joining various internal components, composed of differing materials, with a strong durable bond. One of these critical connections is that of the electrode material to the current collector. As the name implies, the current collector gathers or collects the current that is generated within the electrochemical cell.

In the case of a primary electrochemical cell, the cell may comprise an anode current collector, a cathode current collector or both. The anode or cathode primary cell current collector typically comprises a sheet of metal in the form of either a solid substrate, a mesh or a screen. In the case of a secondary cell, the inside surface of the case typically acts as the current collector.

However, because of the diverse materials with their respective distinct material properties, it is sometimes difficult to join and bond the current collector and the electrode material together. Typically the electrode material is pressed within the opening of the screen or the electrode material is pressed on the surface of the current collector. This prior pressing method generally requires hydraulic pressing to form a mechanical bond between the current collector and electrode material. Furthermore, this process requires a generally clean surface and the application of upwards of a 175 pound-force or more of pressure to secure the electrode material therewithin.

Joining the current collector to the electrode material with a hydraulic process has been historically problematic. For example, in constructing an anode current collector, a current collector mesh surface, which is typically composed of titanium, stainless steel or nickel, is pressed to that of an anode material, typically composed of lithium. Since the lithium material is generally of a pliable nature, the lithium typically conforms to the surface of the current collector. However, deformation of the lithium electrode material under such high pressures could result in changes to its electrical properties. For instance, contamination from the surface of the hydraulic press could transfer to the lithium material. Furthermore, since the lithium electrode material is pressed against the surface of the current collector, there is a possibility that the electrode material may separate from the surface of the current collector, particularly when pressed against a current collector with a solid surface.

In addition, the hydraulic pressing method is time consuming and not well suited for a manufacturing process. The application of such a large amount of pressure is generally difficult to control and operate in a confined space, such as within the case of an electrochemical cell. Furthermore, the application of such a large force could result in the mechanical deformity of the case or current collector screen itself.

Electrode materials such as lithium generally have a significantly low melting temperature as compared to the material of the current collector, which are generally titanium, nickel and stainless steel. According to the $84^{th}$ edition of the Handbook of Chemistry and Physics, lithium has a melting temperature of about 180.5° C., whereas materials such as titanium and nickel have melting temperatures of about 1,668° C. and 1,455° C., respectively. The significantly lower melting temperature of lithium makes conventional resistance and laser welding processes prohibitive. The temperatures generated by these welding techniques typically well exceed the melting temperature and in many cases exceed the boiling point of lithium of about 1,342° C. As a result, lithium material generally is greatly deformed or even vaporizes before a temperature is reached that sufficiently establishes a weld joint between the lithium and a current collector. Therefore, there is a need for a more effective and efficient means of joining electrode materials, such as lithium, to a current collector.

The present invention eliminates the need to hydraulically press an electrode material onto a current collector. Instead, the welding method of the present invention enables the electrode material to be directly joined to the current collector without any melting of the materials. Such a direct weld procedure reduces cost, complexity and creates a more robust connection. The ultrasonic welding process of the present invention is fast, simple, easy to control and effective.

SUMMARY OF THE INVENTION

The present invention relates to a method of joining the surface of an electrode current collector to its associated electrode material. Such a configuration forms a direct connection of the electrode material, such as lithium, to the current collector to provide an electrical connection therebetween. The present invention further relates to a method of joining the electrode material to the current collector of different material compositions, geometries and configurations. The present invention is a method of using an ultrasonic welding process to form a direct connection between the electrode material and its current collector.

In this ultrasonic welding method, two materials of significantly dissimilar melting temperatures are joined together in a strong bond. In that respect, the present invention comprises a method by which materials having dissimilar melting temperatures are directly joined by the simultaneous application of ultrasonic energy. The ultrasonic energy generates ultrasonic vibrational energy capable of joining the lower melting temperature material to the higher melting temperature material at a targeted area.

The applied ultrasonic energy imparts a friction between the surfaces of the two materials creating a solid-state bond therebetween. A mechanical force may also be simultaneously applied during the welding process that further enables joining of the two materials. After the vibrational energy is removed, a strong bond between the two materials is created. Unlike the prior art application of a hydraulic force, a strong weld bond is created at the weld contact using the ultrasonic welding process of the present invention. Therefore, the possibility is minimized that the electrode material may become dislodged from the surface of the current collector. In addition, the likelihood that the current collector, itself may become deformed through application of the greater hydraulic force is reduced.

In a preferred embodiment of the present invention, an active electrode material such as lithium is directly joined to a current collector composed of titanium, stainless steel, copper or nickel. Generally, a current collector is in electrical contact with the active material that comprises the anode, the active material that comprises the cathode, or both. The present invention can also be utilized in a variety of rechargeable or non-rechargeable electrochemical cell designs and chemistries in both case negative and case positive designs.

In a case negative design, the anode is electrically connected to the casing. In this particular example, the anode material is ultrasonically welded to a portion of an interior surface of the case. Alternatively, in a case positive design, the cathode is electrically connected to the casing. In this particular embodiment, the cathode material would be ultrasonically welded to a portion of the interior surface of the case. In either example, the casing may comprise a higher melting temperature material such as titanium, nickel, or stainless steel.

The welding process of the present invention is not limited to connection of an active lithium electrode material to that of an aluminum current collector. Such a welding process can also be used to directly bond a series of materials of dissimilar melting temperatures, preferably metals in which their respective melting temperatures vary significantly.

Thus, the present invention overcomes many inherent difficulties in constructing an electrochemical cell. The present invention increases the cell design capabilities by allowing the active electrode material to directly join a wide variety of metals of differing melting temperatures that were previously not readily bonded to each other using a hydraulic press. The present invention reduces manufacturing cost and reduces construction complexity. The present invention provides for an electrochemical cell with a smaller, more compact size than is capable with some other cell designs. The present invention also allows for utilization of different cell chemistries requiring the use of different current collector materials that would not normally readily allow for a direct connection with commonly used electrode materials.

DETAILED DESCRIPTION OF THE PREFERRED EMBODIMENTS

Figure 1:
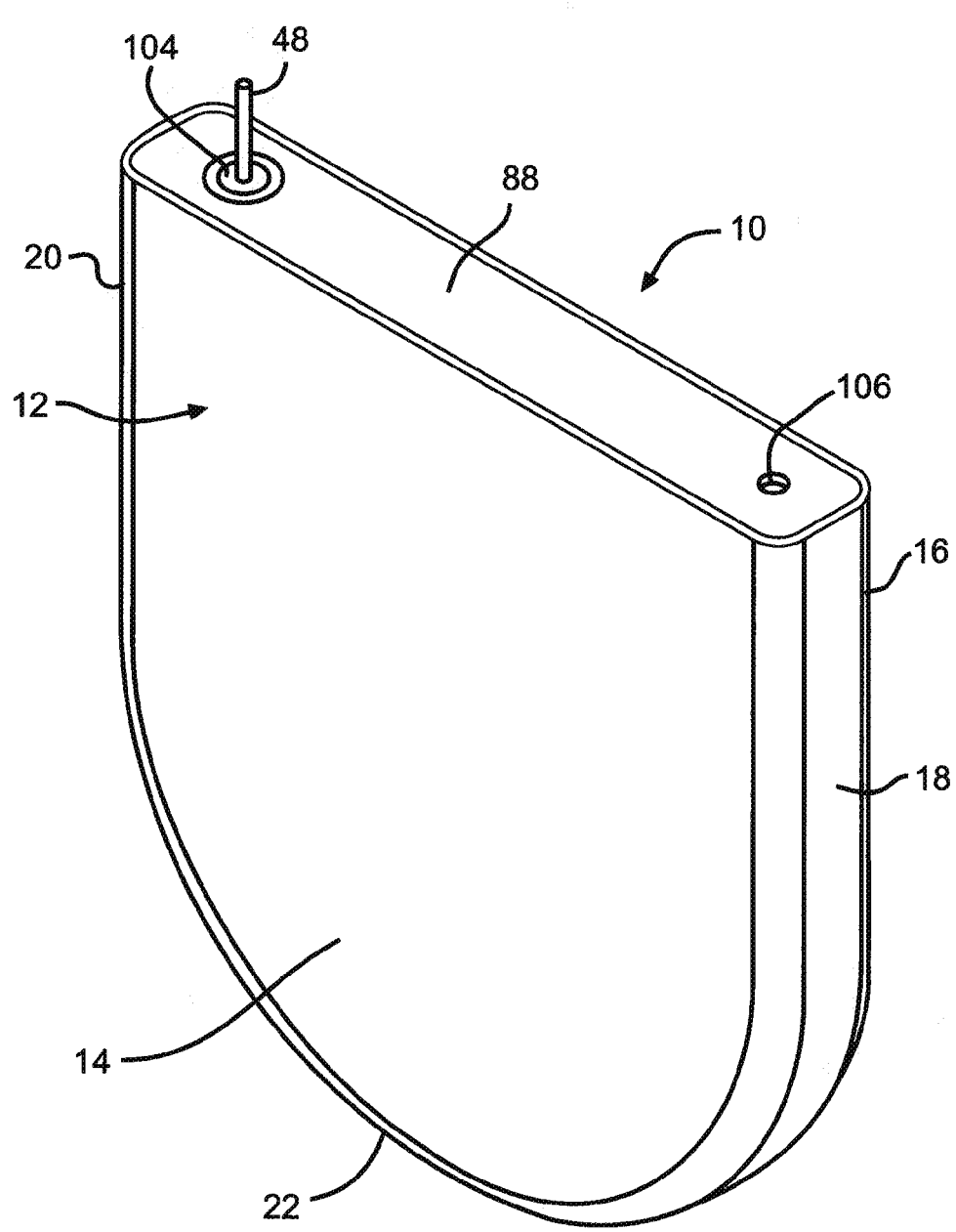
FIG. 1 is a perspective view of an embodiment of an electrochemical cell.
Figure 2:
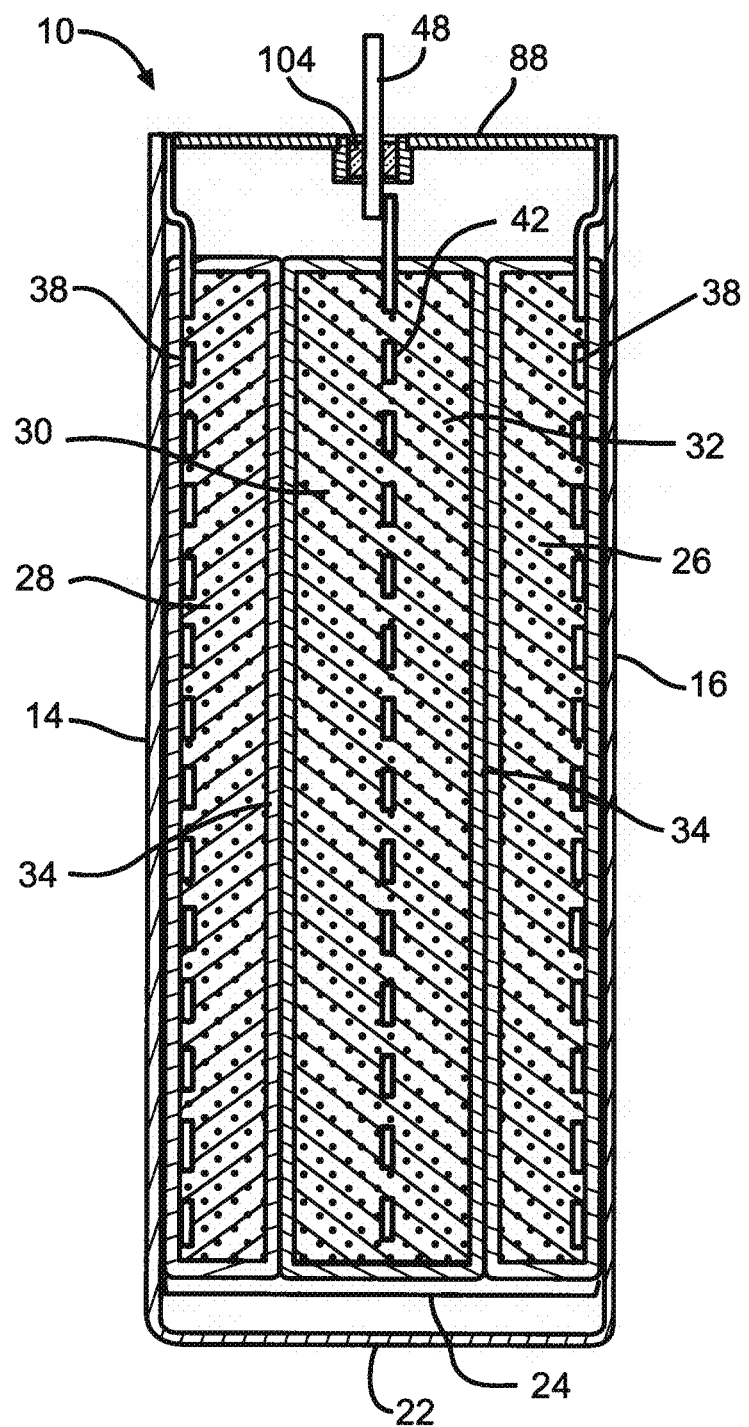
FIG. 2 is a cross-sectional view taken from the side illustrating the internal construction of the electrochemical cell shown in FIG. 1.
Figure 3:
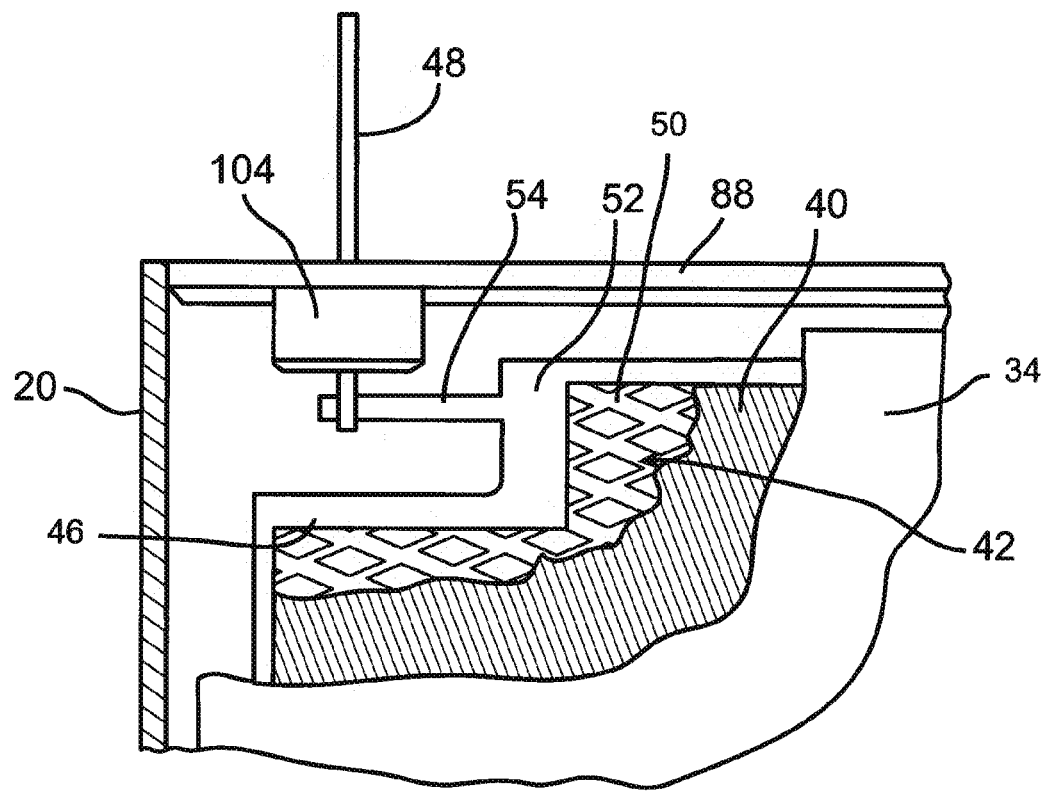
FIG. 3 is a cross-sectional view taken from the side depicting an embodiment of a direct connection of an active electrode material to the current collector 34 of the present invention.

Referring now to FIGS. 1 to 3, there is shown an exemplar electrochemical cell 10 incorporating the ultrasonic welding invention of the present invention. As shown in the embodiment illustrated in FIG. 1, cell 10 comprises a casing 12 having spaced apart first and second side walls 14 and 16 extending to and meeting with opposed end walls 18 and 20 and a bottom wall 22. The end walls can be curved to provide the casing having an oval cross-section, or they can be generally planar to provide a rectangular cross-section. In perspective, electrochemical cell 10 of the illustrated embodiment is similar to the prismatic electrochemical described in U.S. Pat. No. 5,250,373 to Muffoletto et al.

Cell 10 comprises an electrode assembly 24 that further comprises anode components 26, 28 and cathode components 30, 32 prevented from contacting each other by a separator membrane 34. The anode components 26, 28 are composed of an anode active material 36 that is supported on an anode current collector 38. Similarly, the cathode components 30, 32 are composed of an active cathode material 40 that is supported on a cathode current collector 42. As per an embodiment of a method of the present invention, the active anode material 36, preferably composed of lithium, is joined to the anode current collector 38. More specifically, the lithium active anode material 36 is welded to a surface 44 of the anode current collector 38 using an ultrasonic welding process of the present invention. Although lithium is the preferred material, lithium alloys such as lithium silver, lithium aluminum, lithium boron, lithium silver boron, carbon, and combinations thereof may also be used as active anode materials. Likewise, it is contemplated that the cathode active material 40 may also be welded to a portion of a surface 46 of the cathode current collector 42 using an ultrasonic welding process of the present invention.

The embodiment shown in FIG. 2 is commonly referred to in the art as a case negative cell design. Case negative electrochemical cells are constructed with anode components 26, 28 that are electrically connected to casing 12 via the anode current collector 38 while the cathode electrode components 30, 32 are electrically connected to a terminal pin 48 via the cathode current collector 42. Alternatively, a case positive cell design may be constructed by reversing the connections. In other words, terminal pin 48 is connected to the anode components 26, 28 via the anode current collector 33 and the cathode components 30, 32 are connected to the casing 12 via the cathode current collector 42. Furthermore, a case neutral cell design may be constructed comprising two terminal pins 48. Each of the terminal pins 48 are connected to respective anode components 26, 28 and cathode components 30, 32.

Both the anode current collector 38 and the cathode current collector 42 are composed of an electrically conductive material. In a preferred embodiment, the anode current collector 38 or the cathode current collector 42 may be composed of a material, comprising titanium, stainless steel, nickel, their associated alloys, and mixtures thereof. Furthermore, it is contemplated that either current collector 38, 42 may be composed of stainless steel, tantalum, copper, platinum, gold, aluminum, cobalt nickel alloys, highly alloyed ferritic stainless steel containing molybdenum and chromium, and nickel-, chromium- and molybdenum-containing alloys.

It should be noted that the electrochemical cell 10 of the present invention as illustrated in FIGS. 1-3 can be of either a rechargeable (secondary) or non-rechargeable (primary) chemistry of a case negative or case positive design. The specific geometry and chemistry of the electrochemical cell 10 can be of a wide variety that meets the requirements of a particular primary and/or secondary cell application.

As shown in FIG. 3, the cathode current collector 42 of the present invention generally comprises a screen 50, an internal connection tab 52 in the form of a land that is co-planar with and surrounded by screen 50, and an integral external connection tab 54. Screen, as pertains to the present invention, is defined herein as a foil having a solid surface or of a mesh or grid having a series of perforations throughout its surface. The screen is designed such that the cathode or anode active material 40, 36 is ultrasonically welded thereto.

Figure 4:
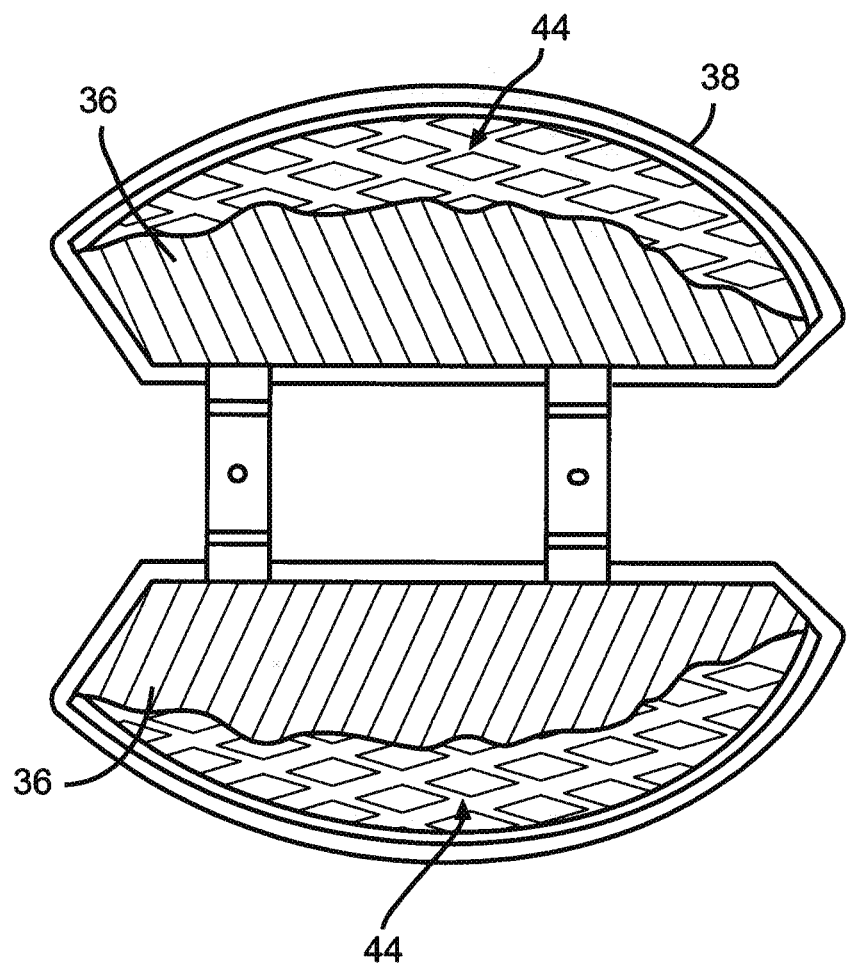
FIG. 4 is a side view of an embodiment of a current collector.

The anode current collector 38 of the present invention, similarly to the cathode current collector 42, also generally comprises a screen 50, an internal connection tab 52 in the form of a land that is co-planar with and surrounded by screen 50, and an integral external connection tab 54. FIG. 4 illustrates a magnified view of an embodiment of the anode current collector 38 on which the active anode electrode 36 has been ultrasonically welded to a portion of the surface 44 thereof. Alternatively, the cathode material 40 may be substituted for the anode electrode material 36. In that case, the current collector would be the cathode current collector 42. In a preferred embodiment, the active anode material 36 or active cathode material 40 may be ultrasonically welded to one or both opposing left and right surfaces of their respective current collector 38, 42.

Figure 5:
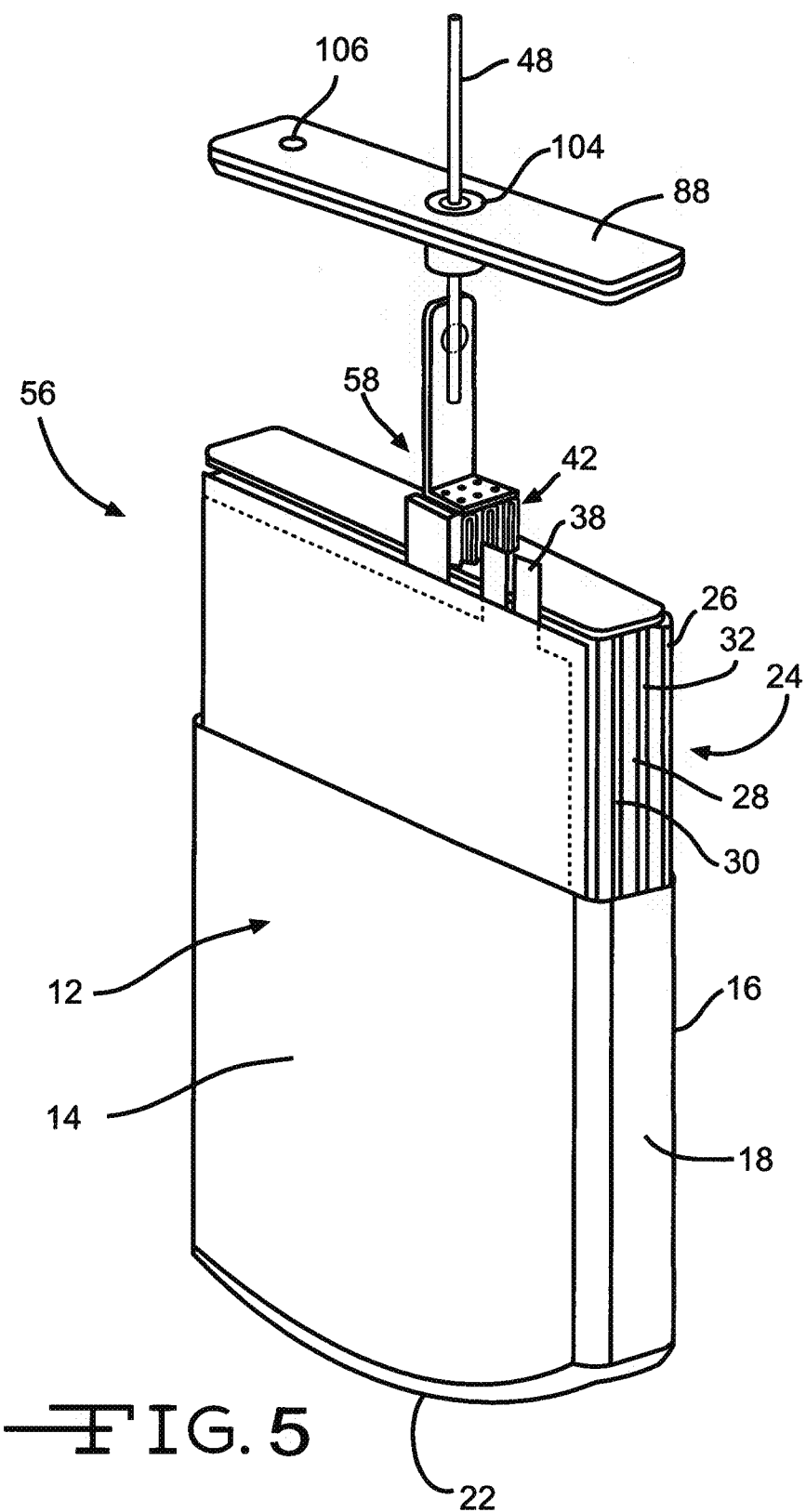
FIG. 5 is a perspective view of an alternate embodiment of an electrochemical cell.

FIG. 5 illustrates an alternate embodiment of an electrochemical cell 56 comprising multiple anode and cathode current collectors 38, 42. As illustrated, the electrode assembly 24 is constructed of alternating cathode components 30, 32 that interleave each other. Each of these cathode components 30, 32 and anode components 26, 28 are incorporated with their respective current collectors 38, 42 with an external tab 54 that extends outside each collector 38, 42. In a preferred embodiment, the anode active material 36 is ultrasonically welded to the anode current collector 38. In addition, the active cathode material 40 may be ultrasonically welded to the cathode current collector 42 as per the method of the present invention.

As illustrated in the embodiment shown in FIG. 5, a bridge 58 is formed from external connection tabs 54 of cathode current collectors 42. The bridge 58 of the illustrated embodiment is comprised of portions of electrically conductive external tabs 54 of cathode current collectors 42 that are folded over each other establishing electrical connection therebetween amongst the plurality of cathode current collectors 42. The associated anode current collectors 38 are electrically connected to casing 12. Therefore the illustrated embodiment, as shown in FIG. 5, is of a case negative cell design. An alternatively preferred embodiment is of a case positive design. In the contemplated case positive cell design, bridge 58 may be comprised of portions of anode current collectors 38.

Figure 6:
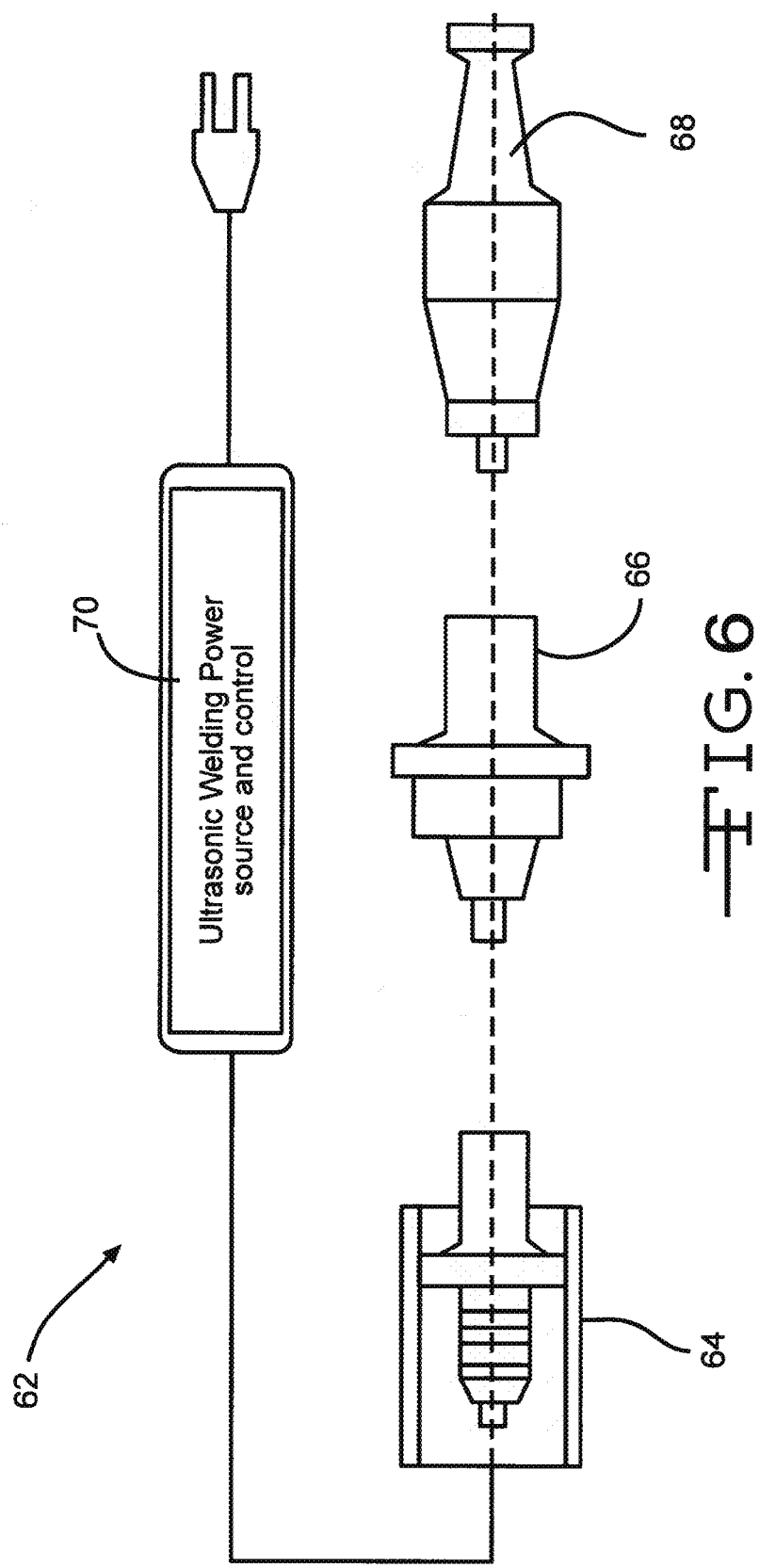
FIG. 6 is a side view illustrating an embodiment of the components of an ultra sonic welding apparatus.

In an embodiment of the present invention, the active anode electrode material 36 is joined to the surface of the anode current collector 38 through the application of an ultrasonic weld 60. The weld 60 is established through the use of an ultrasonic welding apparatus 62 illustrated in FIG. 6. As illustrated, the ultrasonic welder 62 comprises a transducer portion. 64, a booster portion 66, and a horn portion 68. The ultrasonic welder 62 is connected to a power source 70 such as an electrical power source.

Figure 7A:
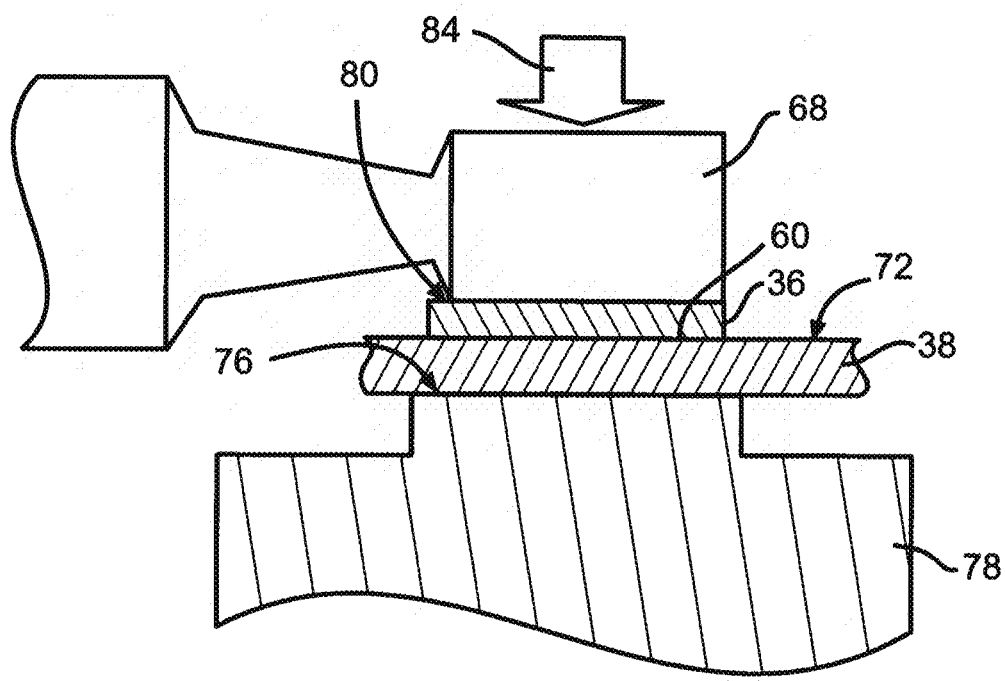
FIGS. 7A and 7B illustrate partial cross-section side views depicting an embodiment of the present invention of an active electrode material being joined to a current collector.
Figure 7B:
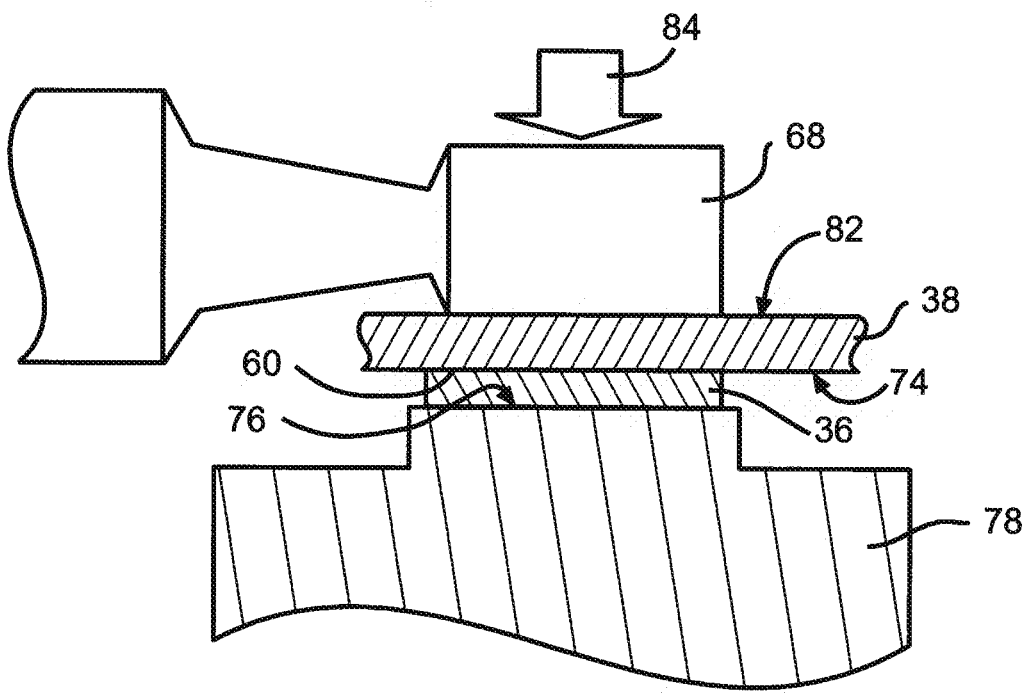

In operation, as shown in the embodiment of FIGS. 7A and 7B, a portion of the anode material 36 is placed on a portion of the surface of the anode current collector 38. More specifically, as illustrated in FIG. 7A, a portion of the anode material 36 is placed on a portion of a top surface 72 of the anode current collector 38. Alternatively, as shown in FIG. 7B, the anode material 36 may be positioned such that it contacts a bottom surface 74 of the anode current collector 38.

Similarly to the anode active material 36 and anode current collector 38 combination illustrated in FIGS. 7A and 7B, the cathode active material 40 and cathode current collector 42 may be substituted for the anode electrode 36 and anode current collector 38 as previously discussed. In other words, a portion of the cathode material 40 may be placed in contact with a portion of the top surface of the cathode current collector 42. Likewise, a portion of the cathode material 40 may be placed in contact with a portion of the bottom surface of the cathode current collector 42. The combination of either the anode material 36 and anode current collector 38, or the cathode material 40 and the cathode current collector 42 is positioned on a hard surface such as that of a top surface 76 of an anvil 78.

Once the ultrasonic welder 62 is energized, the horn portion 68 of the welder 62 is placed in contact with a top layer 80 comprising the anode material 36 or cathode material 40 as illustrated in FIG. 7A. Alternatively, as shown in FIG. 7B, the horn 68 of the ultrasonic welder instrument 62 is placed in contact with a top surface 82 of either of the anode current collector 38 or cathode current collector 42. In either case, the oscillation of the horn portion 68 imparts friction between the top and bottom layers that are to be welded together. The friction created between the top and bottom layers, i.e., that of the active electrode material 36, 40 and the surface of the current: collector 38, 42 as shown in FIG. 7A or that of the current collector 38, 42 and active electrode material 36, 40 as shown in FIG. 7B, initially cleans the respective surfaces. Continued application of the oscillating horn portion 68 imparts a frictional energy that generates a solid-state bond between the layers of material at the weld interface. In a preferred embodiment, the ultrasonic welder 62 is energized such that the horn portion 68 oscillates at a frequency ranging from about 20 kHz to about 40 kHz.

A mechanical force 84 ranging from about 1 lb-force to about 30 lb-force may be applied to the horn portion 68 of the ultrasonic welder 62 in a downward direction. The mechanical force 84 is preferably applied while the ultrasonic welder 62 is energized. Application of the mechanical force preferably keeps the layers of material in close contact and helps encourage the weld joint therebetween.

Figure 8A:
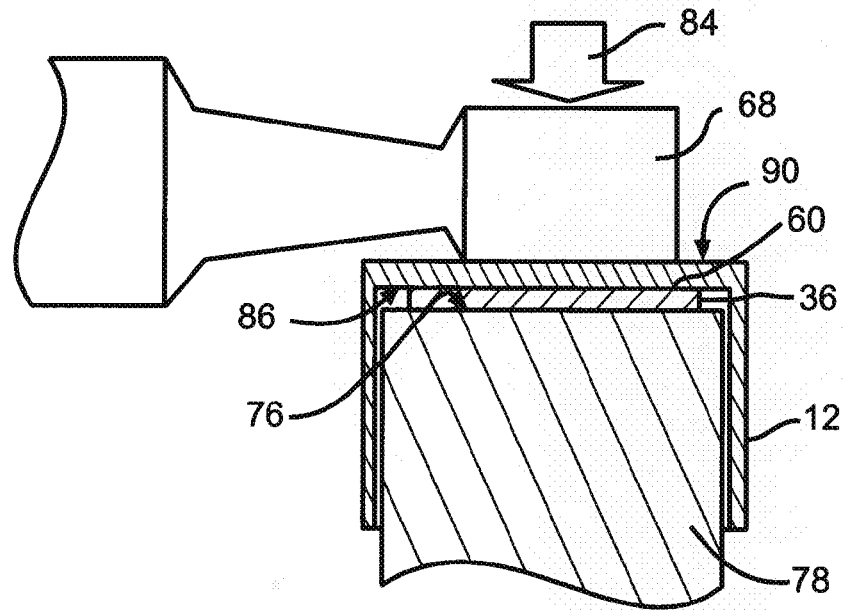
FIGS. 8A and 8B illustrate partial cross-section side views depicting an embodiment of the present invention of an active electrode material being joined to the inside surface of the casing of an electrochemical cell.
Figure 8B:
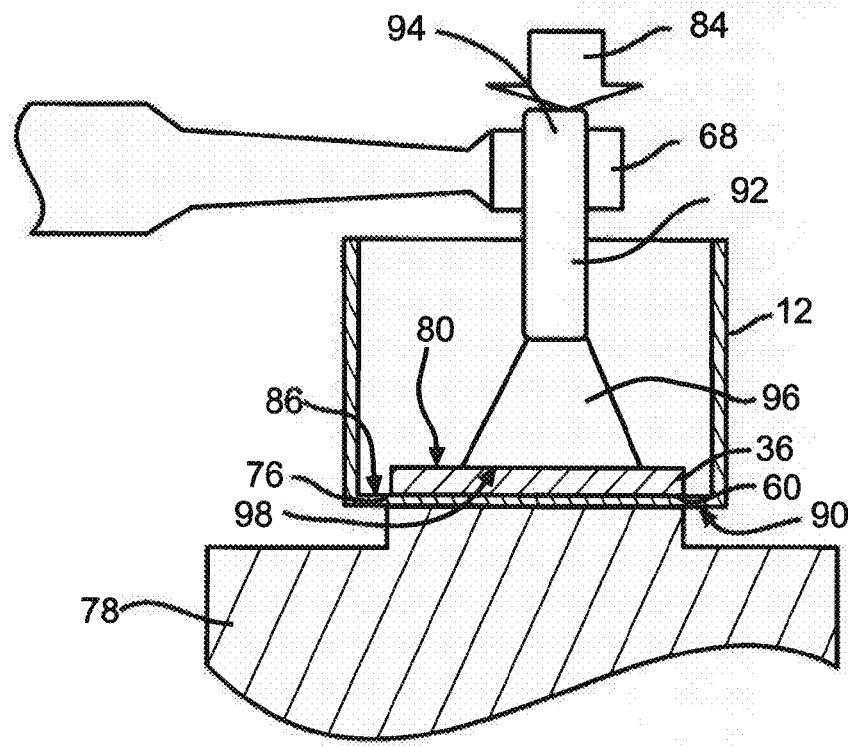

FIGS. 8A and 8B illustrate cross-sectional views of various embodiments of the anode material 36 being welded to an inner surface 86 of the casing 12 of the electrochemical cell.

In the case of a secondary or rechargeable cell, the anode or counter electrode is preferably connected to the casing 12 or a lid 88 (FIGS. 1-3, 5). Specifically, the anode material 36 is preferably positioned such that it is in contact with a portion of the inner surface 86 of the casing 12 or lid 88 of the cell such that it is ultrasonically welded thereto according to the method of the present invention. A preferred material for the casing 12 or lid 88 is titanium although stainless steel, mild steel, nickel-plated mild steel and aluminum are also suitable.

As shown in FIG. 8A, the inner surface 86 of the casing 12 is positioned such that it is facing the top surface 76 of the anvil 78. The anode active material 36 is positioned between the inner surface 86 of the casing 12 and the top surface of the anvil 78. The horn portion 68 of the welder 62 is placed in contact with an outer surface 90 of the bottom wall 22 of the casing 12. In this embodiment, the energy from the ultrasonically oscillating horn portion 68 penetrates through the thickness of the casing's bottom wall 22, imparting frictional energy between the inner surface 86 of the casing 12 and the anode material 36. Similar to the previous embodiments depicted in FIGS. 7A and 7B, a mechanical force 84 ranging from about 1 lb-force to about 30 lb-force may be applied to the horn portion 68 in a downwardly direction.

Figure 9:
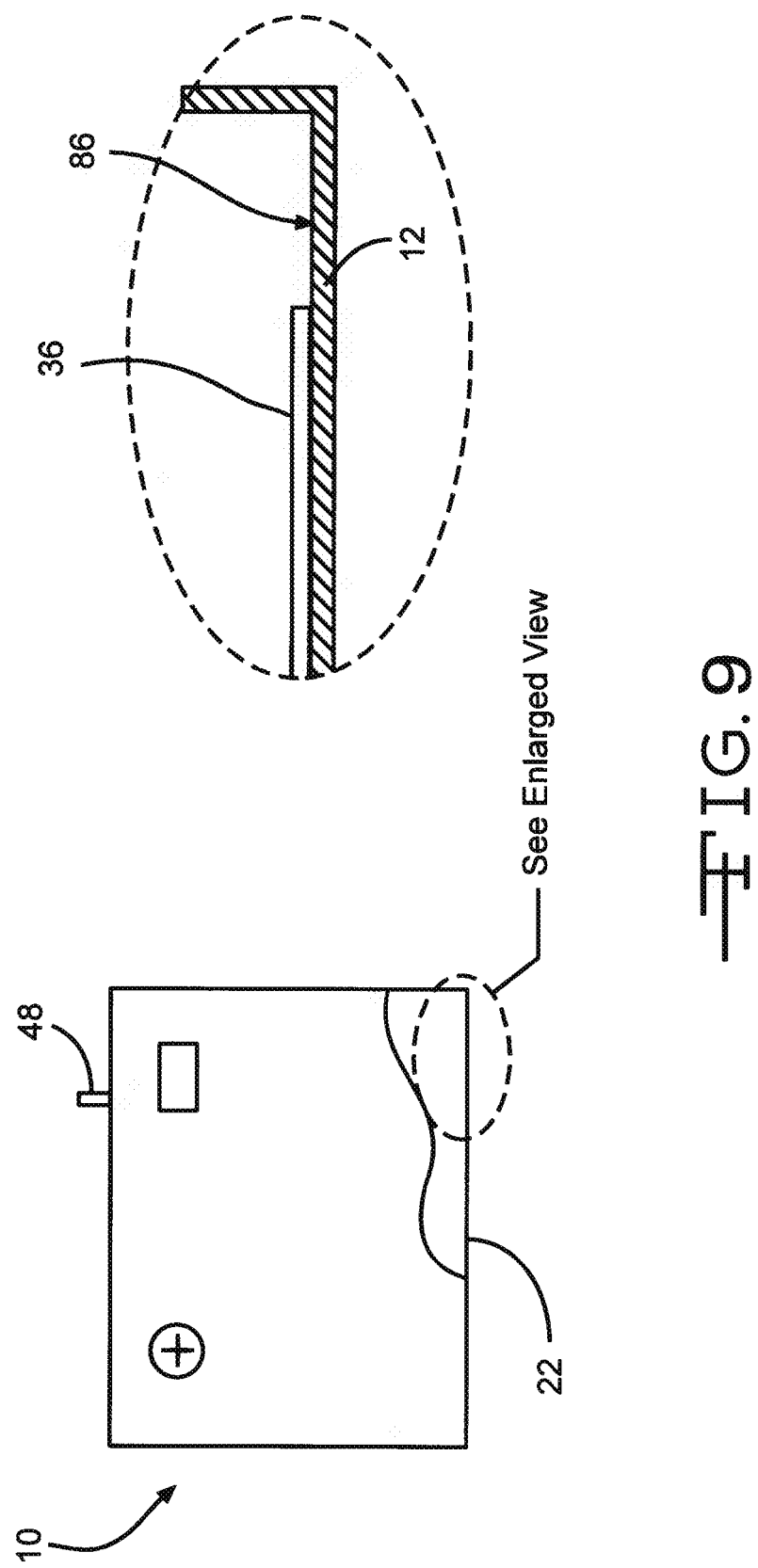
FIG. 9 is a side view in cross-section illustrating an anode material welded to a portion of an inside surface of the casing of an electrochemical cell.

Alternatively, as illustrated in FIG. 8B, the casing 12 may be positioned in an upright position. As shown, the outer surface 90 of the bottom wall 22 of the case 12 is in contact with the top surface 76 of the anvil 78. A layer of active anode material 36 is positioned within the casing 12. The active anode material 36 is positioned such that its bottom surface contacts a portion of the inner surface 86 of the casing 12. As illustrated, an ultrasonic welding extension 92 contacts both the horn portion 68 and the top surface of the active anode material 36. Specifically, a top end portion 94 of the welding extension 92 is in contact with the welder horn 68. The horn 68 is positioned perpendicularly through an opening that extends through the top end portion 94 of the extension 92. The extension 92 includes a base portion 96 with a wide bottom. As shown, a bottom surface 98 of the base 96 of the extension 92 is in contact with the top surface 80 of the active anode material 36. In operation, the welding extension 92 serves as a conduit that transfers ultrasonic energy from the horn 68 to the active anode material 36. Alternatively, the extension 92 may be an elongated portion of the horn 68. In a preferred embodiment, the ultrasonic energy emanating from the horn 68 vibrates the top end portion 94 of the extension 92. The vibrational energy transfers down the extension 92 to the base 96 where it is imparted onto the active anode material 36. The imparted vibrational energy thereby establishes a weld joint between the bottom surface of the anode active material 36 and the inner surface 86 of the casing 12. FIG. 9 illustrates a further embodiment of the active anode material 36 having been welded to an interior surface 86 of the casing 12. For example, the active anode material 36 is shown welded in the lower right hand corner of the casing 12 as illustrated in the figure. It is further contemplated that the active cathode material 40 may be substituted for the active anode material 36 according to the method of the present invention.

Figure 10A:
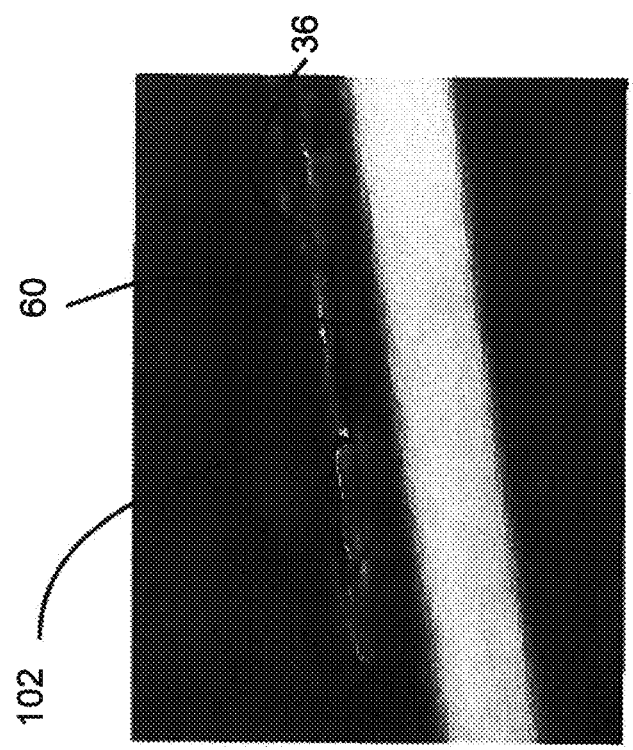
FIGS. 10A and 10B are micrographs depicting an embodiment of a lithium active electrode material welded to that of an inner casing surface.
Figure 10B:
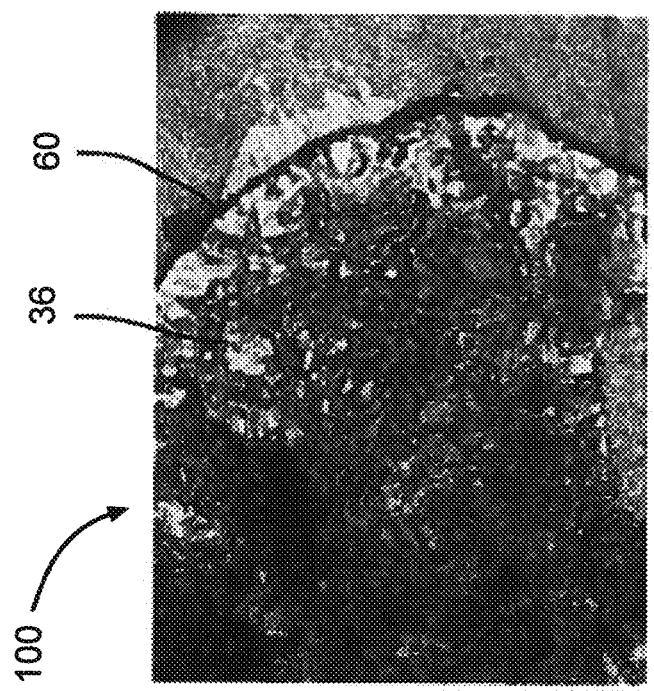

FIGS. 10A and 10B depict perspective views of the structure of the resulting weld after the two metals are joined using the ultrasonic weld process of the present invention. As shown, a bond between the two metals is established when the ultrasonic energy establishes a solid state bond between the lower melting temperature anode material 36 and the surface of the higher melting temperature current collector 38, 42, case 12 or lid 88. Specifically as related to the present invention, transverse vibrations are delivered by the horn to the welding zone that are parallel to the weld surfaces, i.e. the anode material 36 and the surface of the current collector 38, 42, case 12 or lid 88 creating a solid state weld area 100 therebetween.

As depicted in the micrographs in FIGS. 10A and 10B, an interface 102 is created between the lower melting temperature and higher melting temperature metals joined together. It is along this interface 102 that the first and second metals, more specifically the active electrode materials 36, 40 are joined together with the current collector 38, 42, case 12, or lid 88. Unlike the prior method of pressing, a permanent bond between the two metals is formed.

As previously mentioned, the present invention is applicable to either primary or secondary electrochemical cells. A primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil.

The active cathode material 40 of a primary cell is of electrically conductive material, preferably a solid material. In a preferred embodiment, the active cathode material 40 may be of a sheet or foil form. Furthermore, the cathode material 40 may comprise a metal element, a metal oxide, a mixed metal oxide and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell, the cathode active material is mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

The cathode component 30, 32 may be prepared by rolling, spreading or pressing such that it is generally of a sheet or foil form. Although it is preferred that the active cathode material 40 is ultrasonically welded to the surface of the cathode current collector 42, as per the present invention, the cathode electrode material 40 may be pressed onto the surface of the cathode current collector 42. The cathode material may also be prepared in the form of a strip wound with a corresponding strip of anode material in a structure similar to a "jellyroll" or a flat-folded electrode stack.

In order to prevent internal short circuit conditions, the cathode 30, 32 is separated from the anode 26, 28 by the separator membrane 34. The separator membrane 34 is preferably made of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GEL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

By way of example, in an illustrative case negative primary cell, the active material of cathode body is silver vanadium oxide as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

In secondary electrochemical systems, the anode 26, 28 comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless the form of carbon, fibers of the carbonaceous material are particularly advantageous because they have excellent mechanical properties that permit them to be fabricated into rigid electrodes capable of withstanding degradation during repeated charge/discharge cycling.

The cathode 30, 32 of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

The lithiated active material is preferably mixed with a conductive additive selected from acetylene black, carbon black, graphite, and powdered metals of nickel, aluminum, titanium and stainless steel. The electrode further comprises a fluoro-resin binder, preferably in a powder form, such as PTFE, PVDF, ETFE, polyamides and polyimides, and mixtures thereof.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

The casing header comprises a metallic lid having an opening to accommodate a glass-to-metal seal 104 and terminal pin feedthrough 48 for the cathode. An additional opening 106 is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto.

Now, it is therefore apparent that the present invention has many features among which are reduced manufacturing cost and construction complexity. While embodiments of the present invention have been described in detail, it is for the purpose of illustration, not limitation.

What is claimed is:

1. An electrochemical cell, comprising:
   a) a casing;
   b) an electrode assembly contained within the casing, the electrode assembly comprising:
      i) an anode composed of an active anode material;
      ii) a cathode composed of an active cathode material;
      iii) a first current collector composed of a first metal having a first current collector surface, wherein at least a portion of one of the active anode material and the active cathode material is directly bonded to at least a portion of the first current collector surface by a first ultrasonic weld therebetween;
      iv) a separator membrane residing between the anode and the cathode; and
      v) an electrolyte contained within the casing to activate the anode and the cathode; and
   c) a terminal pin having a distal pin portion spaced apart from a proximal pin portion, the distal pin portion extending outside the casing in an electrically insulated relationship therewith, wherein the proximal pin portion is electrically connected to the first current collector.

2. The electrochemical cell of claim 1 wherein the active anode material is selected from the group consisting of lithium, lithium silver, lithium aluminum, lithium boron, lithium silver boron, carbon, and combinations thereof.

3. The electrochemical cell of claim 1 wherein the first metal of the first current collector is selected from the group consisting of titanium, nickel, and stainless steel.

4. The electrochemical cell of claim 1 wherein the casing comprises a material selected from the group consisting of titanium, nickel, and stainless steel.

5. The electrochemical cell of claim 1 wherein the electrode assembly comprises a second current collector having a second current collector surface, wherein at least a portion of the other of the active cathode material and the active anode material not bonded to the first current collector by the first weld is directly bonded to a portion of the second current collector surface by a second ultrasonic weld.

6. The electrochemical cell of claim 1 wherein at least a portion of the other of the active anode material and the active cathode material not bonded to the first current collector by the first weld is directly bonded to a portion of an interior surface of the casing by a second ultrasonic weld.

7. The electrochemical cell of claim 1 wherein at least a portion of the other of the active anode material and the active cathode material not bonded to the first current collector by the first weld is directly bonded to a portion of an interior surface of a lid of the casing by a second ultrasonic weld.

8. The electrochemical cell of claim 1 wherein the electrolyte comprises a nonaqueous solvent and an ionically conductive salt dissolved therein.

9. The electrochemical cell of claim 1 wherein the casing comprises a first casing portion having a first portion interior surface closed by a second casing portion having a second portion interior surface, wherein the other of the active anode material and the active cathode material not bonded to the first current collector is directly bonded to at least a portion of the interior surface of the first or second portion by a second ultrasonic weld therebetween.

10. An electrode assembly, comprising:
    a) a first electrode composed of a first active electrode material;
    b) a second electrode composed of a second active electrode material;
    c) a first current collector composed of a first metal having a first current collector surface, wherein at least a portion of one of the first active electrode material and the second active electrode material is directly bonded to at least a portion of the first current collector surface by a first ultrasonic weld therebetween; and
    d) a separator membrane residing between the first and second electrodes.

11. The electrode assembly of claim 10 wherein the first active electrode material is selected from the group consisting of lithium, lithium alloys, lithium silver, lithium aluminum, lithium boron, lithium silver boron, carbon, and combinations thereof.

12. The electrode assembly of claim 10 wherein the second active electrode material is selected from the group consisting of silver vanadium oxide, copper silver vanadium oxide, manganese dioxide, cobalt nickel, nickel oxide, copper oxide, copper sulfide, iron disulfide, titanium disulfide, copper vanadium oxide, lithium nickel oxide, lithium manganese oxide, lithium cobalt oxide, lithium cobalt tin oxide, lithium cobalt nickel oxide and mixtures thereof.

13. The electrode assembly of claim 10 wherein the first current collector metal is selected from the group consisting of titanium, nickel, and stainless steel.

14. The electrode assembly of claim 10 further comprising a second current collector having a second current collector surface, wherein at least a portion of the other of the first active material and the second active electrode material not bonded to the first current collector by the first weld is directly bonded to a portion of the second current collector surface by a second ultrasonic weld therebetween.

15. The electrode assembly of claim 14 wherein the second current collector comprises a collector metal selected from the group consisting of titanium, nickel, and stainless steel.

16. An electrochemical cell, comprising:
    a) a casing;
    b) an electrode assembly contained within the casing, the electrode assembly comprising:
        i) an anode composed of a lithium anode material;
        ii) a cathode composed of an active cathode material;
        iii) a first current collector composed of a first metal having a first current collector surface, wherein at least a portion of the lithium anode material is directly bonded to the first current collector surface by a first ultrasonic weld therebetween;
        iv) a separator membrane residing between the anode and the cathode; and
        v) an electrolyte contained within the casing to activate the anode and the cathode; and
    c) a terminal pin having a distal pin portion spaced apart from a proximal pin portion, the distal pin portion extending outside the casing in an electrically insulated relationship, wherein the proximal portion is electrically connected to the first current collector.

17. The electrochemical cell of claim 16 wherein the first metal is selected from the group consisting of titanium, nickel, and stainless steel.

18. The electrochemical cell of claim 16 wherein the casing comprises a material selected from the group consisting of titanium, nickel, and stainless steel.

19. The electrochemical cell of claim 16 further comprising a second current collector having a second current collector surface, wherein at least a portion of the active cathode material is directly bonded to a portion of the second current collector surface by a second ultrasonic weld therebetween.

20. The electrochemical cell of claim 16 wherein the first current collector is a casing lid and the first current collector surface is an interior surface of the lid.

21. The electrochemical cell of claim 16 wherein the electrolyte comprises a nonaqueous solvent and an ionically conductive salt dissolved therein.

22. The electrochemical cell of claim 16 wherein the lithium anode material is selected from the group consisting of lithium, lithium alloys, lithium silver, lithium aluminum, lithium boron, lithium silver boron, carbon, and combinations thereof.

23. The electrochemical cell of claim 16 wherein the casing comprises a first casing portion closed by a second casing portion, wherein the first current collector is either the first casing portion or the second casing portion and the first current collector surface is either an interior surface of the first casing portion or the second casing portion.

* * * * *